United States Patent [19]

Muneta

[11] 4,191,650
[45] Mar. 4, 1980

[54] OIL-COLLECTING SHIP FOR OIL SPILLS
[75] Inventor: Hiroto Muneta, Kashiwa, Japan
[73] Assignee: Mitsui Ocean Development & Engineering Co., Ltd., Tokyo, Japan
[21] Appl. No.: 921,588
[22] Filed: Jul. 3, 1978
[30] Foreign Application Priority Data
Oct. 13, 1977 [JP] Japan .................................. 51-136242
[51] Int. Cl.² ........................................... E02B 15/04
[52] U.S. Cl. .......................... 210/242 S; 210/DIG. 25
[58] Field of Search .................... 114/270; 210/242 S, 210/DIG. 25

[56] References Cited
U.S. PATENT DOCUMENTS

| 3,630,376 | 12/1971 | Price | 210/242 S |
| 3,666,099 | 5/1972 | Galicia | 210/DIG. 25 X |
| 3,966,614 | 6/1976 | Ayers | 210/242 R |

FOREIGN PATENT DOCUMENTS 1440978  6/1976  United Kingdom ..................... 114/270

Primary Examiner—Charles E. Frankfort
Assistant Examiner—James B. Bechtel
Attorney, Agent, or Firm—Dann, Dorfman, Herrell and Skillman

[57] ABSTRACT

A ship for collecting oil from oil spills floating on the surface of the sea comprising a pair of side hulls forming between them a flow passage through which a stream of oil-laden water will flow when the ship travels through the floating oil on the sea. Between the side hulls, a center hull is provided in which a well is formed having a bottom which opens into the flow passage and through which the oil in the passage may float upwardly to be trapped in the well. A pump is provided to pump the trapped oil from the well. The bottom of the well is below the surface of the sea and the stream is deflected under the bottom by a forwardly-inclined segment extending between the side hulls. A splash plate is provided to overlie the upper end of the segment to direct the upward splashes from the segment over the top edge of the segment into a splash chamber behind the segment. The water and/or oil collected in the splash chamber may flow into the well through a communicating opening.

7 Claims, 4 Drawing Figures

U.S. Patent   Mar. 4, 1980   Sheet 1 of 2   4,191,650
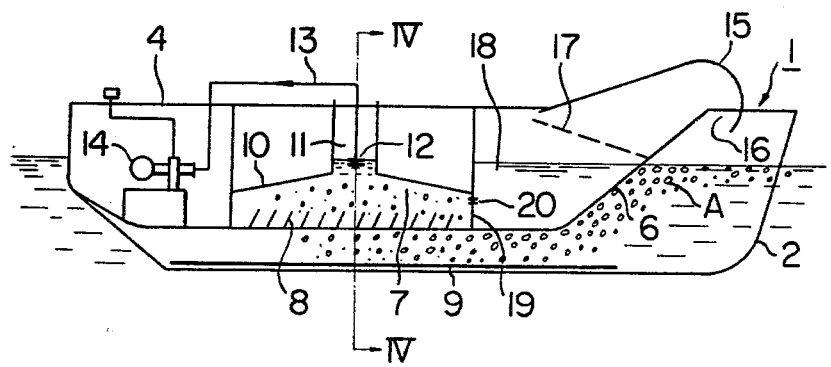
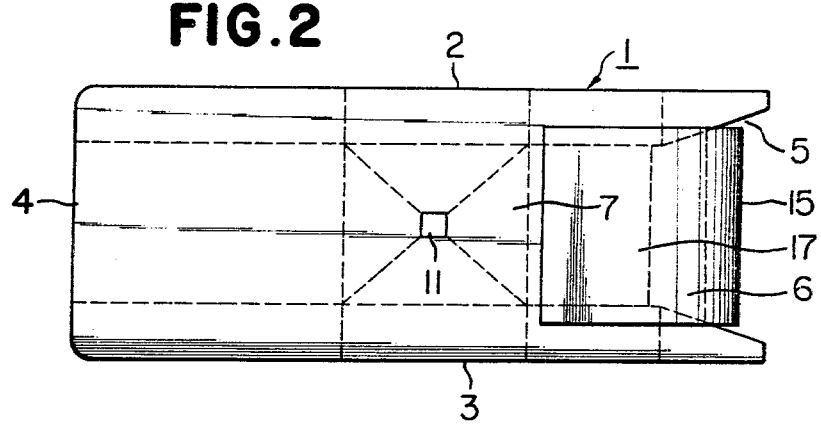

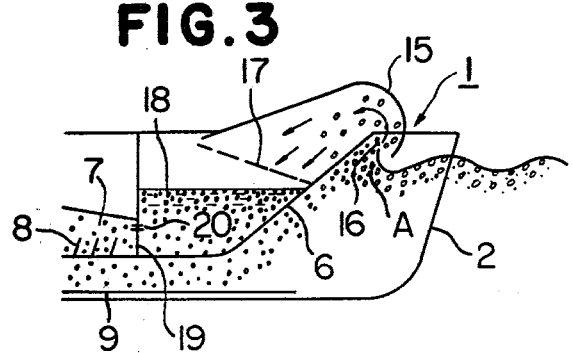
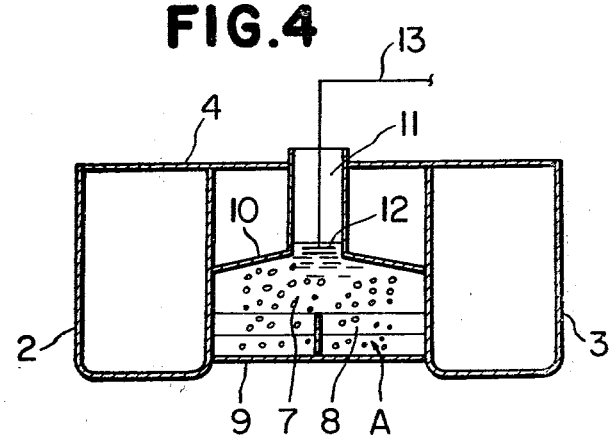

OIL-COLLECTING SHIP FOR OIL SPILLS

The present invention relates to an oil-collecting ship that collects oil floating on the surface of the sea, for example from oil spills, and more particularly, to a ship which is highly efficient for use in heavy seas having rough wave action.

The conventional oil-collecting ships are subject to a sharp loss in efficiency when the sea is rough, as compared to when the sea is calm.

A primary object of the present invention is to provide an oil-collecting ship for oil spills that overcomes this loss in efficiency.

More particularly, the present invention provides a design for an oil-collecting ship wherein means is provided to receive the water and oil which is splashed upwardly during rough seas and to deflect these splashes into a collecting chamber from which the oil may be recovered.

All of the objects of the invention are more fully set forth hereinafter with reference to the accompanying drawings, wherein:

FIG. 1 is a diagrammatic longitudinal cross-section of an oil-collecting ship embodying the present invention;

FIG. 2 is a diagrammatic planned view of the ship shown in FIG. 1;

FIG. 3 is a fragmentary view of the forward end of the ship shown in FIG. 1 illustrating the function of the splash plate of the present invention in rough seas; and FIG. 4 is a transverse sectional view of the ship shown in FIG. 1.

Referring now to the drawing, the preferred embodiment of this invention illustrated therein comprises a ship 1, similar to a catamaran, having two side hulls 2 and 3 held side-by-side in laterally spaced relation by an intermediate central hull 4. The confronting surfaces of the side hulls at the bow of the ship converge to form a V-shaped opening 5 (see FIG. 2) that facilitates taking in seawater as the ship 1 advances, and causes the seawater to flow in a stream in the flow passage formed between the side hulls 2 and 3.

The center hull 4 of the ship overlies the flow passage and has a well chamber 7 having a bottom with an opening in said flow passage. The bottom of the well 7 is provided with a grated baffle plate 8. Spaced below the baffle plate 8, and generally parallel thereto, is a horizontal guide plate 9 extending between the side hulls 2 and 3. The upper wall 10 of the well 7 is in the form of a truncated pyramid opening at the top in a upwardly-extending receiver 11. A floating suction device 12 is floated in the receiver 11 and is connected by a pipe 13 to a pump 14.

At its forward end, the well 7 is provided with a vertical wall 19 extending between the bottom and the upper wall or cover plate 10. Forwardly from the lower end of the wall 19, a segment or deflector 6 inclines forwardly between the confronting surfaces of the side hulls 2 and 3. The inclined segment of the deflector surface 6 is effective to direct the stream of oil-laden seawater through the flow passage between the hulls 2 and 3.

At the front end of the segment 6, a curved return-wave-receiving splash plate 15 overlies the upper terminal edge of the deflector plate segment 6 in spaced relation thereto. As shown in FIGS. 1 and 3, the splash plate 15 is curved so that the front end of the plate depends below the level of the top end of the inclined segment 6 and forms an opening or passageway between the segment 6 and the tip of the splash plate 15. As shown in FIG. 1, in calm seas when the ship advances through the oil-laden water, the floating oil on the surface collects against the inclined segment 6 and creates a substantial thickness of oil in a layer as indicated at A in front of the inclined segment. The forward end of the splash plate 15 is spaced from the surface of the segment 6 by a distance corresponding substantially to the thickness of the layer A. Rearwardly from the front edge, the splash plate 15 curves upwardly beyond the top of the segment 6 so that the spacing from the top edge of the segment increases gradually. Behind the top of the segment 6, the rear portion of the splash plate 15 declines in a straight run until it reaches the top of the intermediate hull 4. A grate or buffer plate 17 having openings therethrough inclines rearwardly from the rear surface of the segment 6 toward the rear end of the splash plate 15. The forward wall 19 of the well 7 and the rear surface of the segment 6 define between them a splash chamber 18 underlying the buffer plate 17. A communication passage 20 is provided between the splash chamber 18 and the well 7.

When the ship operates on smooth water, the oil-spill oil floating on the water surface is deflected into the flow passage by the intake section 5 between the hulls 2 and 3, forming an increasingly thicker layer of oil in front of the inclined segment as shown at A. The oil is granulated or agglomerated into drops as it is deflected downwardly under the bottom wall of the well 7 by the forwardly-directed surface of the segment 6. As it passes under the opening in the bottom wall of the well 7, the oil in the stream may float upwardly through the open bottom to be trapped in the well 7. The horizontal guide plate 9 facilitates the oil rising into the well 7 by reducing the speed of the stream as it flows under the bottom. The baffle plate 8 prevents the occurrence of a large whirlpool in the well 7 and avoids the escape of the oil floating therein to the outside of the ship. The oil collected in the well 7 is guided by the cover plate 10 into the receiver 11 from whence it is sucked through the suction device 12 by the pump into an oil tank inside the ship or through piping outside thereof.

On a smooth sea, the oil collecting in front of the segment 6 is granulated or agglomerated into oil drops of suitable size that readily float upwardly in the well 7, thereby providing a high oil recovery rate. On the other hand, when the sea is rough and the waves are high, powerful splash from the inclined segment 6 divides the oil into oil drops which are too fine to attain such ideal floating.

In accordance with the present invention, however, when the oil with the seawater splashes against the inclined segment 6 and splashes upwardly, urged by the surging waves, as shown in FIG. 3, it impinges against the underside of the splash plate 15. The rising oil passing through the opening 16 passes over the top end of the segment 6 and flows into the splash chamber 18 in the central hull 4. After striking the buffer plate 17, the oil enters the splash chamber at a reduced speed and after its agitation has been calmed or reduced in the chamber 18, the oil may flow through the communication passage 20 into the well 7. The oil flowing into the well 7 through the passage 20 rises to the surface along with the oil coming in through the bottom passed baffle plate 8 and is collected as described above.

Since the seawater coming through the opening 16 is at the surface where it is largely covered by floating oil, the oil spill can efficiently be introduced into the well 7 even when the sea is rough and the waves are high. The passage of the oil through the buffer plate and collection in the splash chamber 18 permits the oil in this chamber to agglomerate and contributes to the efficiency of collection of the oil rising upwardly through the bottom opening of the well 7, even though the latter oil may be too finely agglomerated to permit easy floating.

By means of the present invention, the low efficiency of the conventional oil-collecting ships for oil spills when the waves are high has been overcome. In accordance with the invention, the oil-collecting ship having the splash plate of very simple construction, utilizes the energy of the waves, and by using this energy, remarkably improves the oil-collecting efficiency and greatly enhances the operation.

While a particular embodiment of the present invention has been herein illustrated and described, it is not intended to limit the invention to such disclosure but changes and modifications may be made therein and thereto within the scope of the following claims.

I claim:

1. An oil-collecting ship for oil spills comprising a pair of laterally-spaced side hulls forming a flow passage therebetween, a center hull having wall means forming a well having a bottom with an opening in said flow passage between said hulls, a deflector having a forwardly inclined segment formed at the forward part of said bottom to project above the water surface and deflect a stream into said flow passage below said bottom, said well opening in the bottom being behind the inclined segment to permit oil carried by the stream in said flow passage to float upwardly into said well, said segment being spaced forwardly from a forward wall of said well to form a splash chamber therebetween, a return-wave receiving splash plate curving over the top end of the inclined segment in spaced relation thereto and forming an opening between a front end of said splash plate and the inclined segment, and overlying at the other end said splash chamber rearwardly of the inclined segment, said splash plate being operable to direct upward splashes from said segment into said splash chamber, and a communication passage connecting the chamber with the well.

2. A ship according to claim 1 wherein confronting surfaces of said side hulls converge rearwardly to form a V-shaped inlet funnelling the seawater into said flow passage.

3. A ship according to claim 2 wherein the inclined segment terminates rearwardly adjacent to the rearward end of the converging portions of said side hulls whereby the oil surface layer is thickened in the area of its engagement by said segment.

4. A ship according to claim 1 including a buffer plate having openings therethrough extending across the splash chamber below said splash plate to reduce the agitation of the oil-laden water collected in said chamber.

5. A ship according to claim 1 wherein said flow passage has a bottom guide plate underlying the bottom wall of said well.

6. A ship according to claim 5 including a baffle in said opening of said bottom wall.

7. A ship according to claim 1 wherein said well has a cover in the form of a truncated pyramid below the level of the sea surface, said pyramid opening at its top into a receiver for collecting the oil floating upwardly in said well, and including suction means to carry away said collected oil.

* * * * *